US010240993B2

(12) United States Patent
Lux et al.

(10) Patent No.: US 10,240,993 B2
(45) Date of Patent: Mar. 26, 2019

(54) PRESSURE SENSOR FOR RECORDING A PRESSURE OF A FLUID MEDIUM

(71) Applicant: Robert Bosch GmbH, Stuttgart (DE)

(72) Inventors: Alexander Lux, Ostfildern (DE); Patrik Patzner, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 59 days.

(21) Appl. No.: 15/109,786

(22) PCT Filed: Nov. 6, 2014

(86) PCT No.: PCT/EP2014/073937
§ 371 (c)(1),
(2) Date: Jul. 5, 2016

(87) PCT Pub. No.: WO2015/104076
PCT Pub. Date: Jul. 16, 2015

(65) Prior Publication Data
US 2016/0334291 A1 Nov. 17, 2016

(30) Foreign Application Priority Data
Jan. 8, 2014 (DE) .......................... 10 2014 200 082

(51) Int. Cl.
*G01L 9/00* (2006.01)
*G01L 19/14* (2006.01)

(52) U.S. Cl.
CPC ............ *G01L 9/0041* (2013.01); *G01L 19/14* (2013.01); *G01L 19/141* (2013.01); *G01L 2009/0063* (2013.01); *G01L 2009/0067* (2013.01)

(58) Field of Classification Search
CPC . G01L 9/0041; G01L 9/14; G01L 2009/0063; G01L 13/025; G01L 7/00;
(Continued)

(56) References Cited
U.S. PATENT DOCUMENTS 6,311,561 B1 * 11/2001 Bang ..................... G01L 9/0073
73/708
7,793,550 B2 * 9/2010 Elian ..................... B81B 7/0048
73/754
(Continued)

FOREIGN PATENT DOCUMENTS

CN          1633587 A     6/2005
CN        103620361 A     3/2014
(Continued)

OTHER PUBLICATIONS

International Search Report dated Jan. 22, 2015, of the corresponding International Application PCT/EP2014/073937, filed on Nov. 6, 2014.
(Continued)

*Primary Examiner* — Lisa M Caputo
*Assistant Examiner* — Nigel H Plumb
(74) *Attorney, Agent, or Firm* — Norton Rose Fulbright US LLP; Gerard Messina

(57) ABSTRACT

A pressure sensor for recording a pressure of a fluid medium in a measuring cell. The pressure sensor includes a sensor housing, at least one first pressure sensor element for measuring a pressure of the medium, and a drive and/or evaluation circuit for outputting a signal indicative of a pressure acting on the first pressure sensor element. The drive and/or evaluation circuit is configured on or in a circuit substrate disposed within the sensor housing. The first pressure sensor element is configured on or in the circuit substrate and is separated from the fluid medium by at least one first separating membrane.

7 Claims, 2 Drawing Sheets

(58) Field of Classification Search
CPC ... G01L 9/141; G01L 9/00; G01L 2009/0067; G01L 15/00; G01B 7/18; G01B 5/30; F16K 31/02
See application file for complete search history.

(56) References Cited

U.S. PATENT DOCUMENTS

2010/0043530 A1    2/2010  Elian et al.
2017/0315009 A1*  11/2017  Riethmueller .......... G01L 15/00

FOREIGN PATENT DOCUMENTS

| | | |
|---|---|---|
| DE | 10 2008 044098 | 6/2010 |
| DE | 10 2008 054382 | 6/2010 |
| WO | WO 00/45143 | 8/2000 |

OTHER PUBLICATIONS

Reif, Sensors in the Motor Vehicle, 1st Edition, 2010, pp. 80-82.
Reif, Sensors in the Motor Vehicle, 1st Edition, 2010, pp. 134-136.

* cited by examiner

PRESSURE SENSOR FOR RECORDING A PRESSURE OF A FLUID MEDIUM

BACKGROUND INFORMATION

Various devices and methods for recording the pressures of fluid media, such as of gases and liquids, are available in the related art. The measured quantity of the pressure is a nondirectional force that acts in all directions and occurs in gases and liquids. Dynamically and statically acting pickups or sensor elements are used to measure pressures. Dynamically acting pressure sensors are only used for measuring pressure pulsations in gaseous or liquid media. The pressure measurement can be performed directly, by membrane deformation, or by using a force sensor.

In particular, to measure very high pressures, it would suffice to simply expose the medium to an electrical resistance, because, to a greater or lesser degree, all conventional resistors exhibit a pressure dependency. However, it proves to be difficult to thereby simultaneously suppress the dependency of the resistors on temperature and the pressure-tight leading through of the electrical connections thereof out of the pressure medium.

Therefore, for signal acquisition purposes, the most common method for recording pressure initially employs a thin membrane as a mechanical intermediate stage that is exposed on one side to the pressure and deflects to a greater or lesser degree as a function of the pressure. The thickness and diameter thereof can be adapted within a very wide range to the particular pressure range. Low-pressure measuring ranges lead to comparatively large membranes which can deform within the range of from 0.1 to 1 mm. However, high pressures require thicker, low-diameter membranes which, for the most part, only deform by a few micrometers. Pressure sensors of this kind are described in, for example, Konrad Reif (publisher): *Sensoren im Kraftfahrzeug* [Sensors in the Motor Vehicle], 1st edition, 2010, pp. 80-82 and 134-136.

German Patent Application No. DE 10 2008 054 382 A1 describes a pressure sensor module that includes a pressure sensor chip for determining the pressure of a measuring medium, an adapter for transmitting pressure to the pressure sensor chip, a connector part contacted by the pressure sensor chip, as well as fastening means for fixedly securing the pressure sensor module in a receiving opening of a wall. A separate sensor module having a measuring element is used in pressure sensors of this kind. For various media requirements, an application to the rear side of the measuring element or a gel passivation is possible.

In spite of the improvements brought about by these pressure sensors, there is still a potential to optimize known pressure sensors. Thus, when working with adhesively bonded sensor elements of existing pressure sensors, the media resistance provided by the rear-side application is good, but is problematic because of water and particles that can settle on the membrane. The pressure range is limited, and soldered connections are susceptible to corrosion. In the case of the gel passivation, the medium can be diffused by the gel and thereby change the protective action or affect the measurement signals due to various chemical and/or physical processes.

SUMMARY

In accordance with the present invention, a pressure sensor is provided for recording a pressure of a fluid medium that may, at least substantially, overcome the disadvantages of conventional pressure sensors and that makes it possible to devise a robust media resistance for pressure sensors used for diagnosing particulate filters, for example, while, at the same time, expanding the pressure range for new applications, such as exhaust gas back pressure, for example.

A pressure sensor according to the present invention for recording a pressure of a fluid medium in a measuring cell includes a sensor housing, at least one first pressure sensor element for measuring a pressure of the medium, and a drive and/or evaluation circuit for outputting a signal indicative of the pressure acting on the pressure sensor element. The drive and/or evaluation circuit is configured on or in a circuit substrate disposed within the sensor housing. The pressure sensor element is configured on or in the circuit substrate and separated from the fluid medium by at least one first separating membrane.

The pressure sensor element is integrated in the circuit substrate, for example. The pressure sensor element may be spaced apart from the separating membrane. A transmission cell is configured between the pressure sensor element and the separating membrane, for example. The transmission cell may be filled with a transmission medium that is suited for transmitting a fluid medium pressure acting on the separating membrane to the pressure sensor element. The transmission medium may be a liquid. For example, the transmission medium is a liquid having a low rate of thermal expansion, a low viscosity, and a low water absorption rate in order to be insensitive to temperature influences. The transmission medium is an oil, for example. The pressure sensor element may be configured in a sensor element cell in the circuit substrate. The sensor element cell may be filled with a transmission medium. The transmission medium is oil, for example. The sensor element cell may be sealed by a sealing element. The sensor element cell may be separated from an interior space of the sensor housing by a second separating membrane. The second separating membrane may be designed to apply a counterpressure. The transmission medium in the sensor element cell may be suited for transmitting the counterpressure acting on the second separating membrane to the first sensor element. At least one second pressure sensor element, which is designed to measure a counterpressure applied to the first separating membrane, may be configured on or in the circuit substrate.

The counterpressure may be applied electrically or mechanically. This type of configuration makes it possible for a differential pressure to be recorded.

In accordance with the present invention, an oil seal is provided, which is integrated in the circuit substrate, with a pressure sensor element. The measuring elements are integrated in the circuit substrate by what is generally known as embedding, for example. The pressure feeds are to have an open design. A separating membrane is subsequently integrated into the circuit substrate, and the resulting volumes filled with a suitable pressure transmission medium. The measuring elements for the pressure measurement may have a single-chip design, i.e., a membrane having an integrated evaluation circuit, or a dual-chip design, i.e., a membrane having a separate evaluation circuit. Moreover, a plurality of measuring elements may also be installed per circuit substrate. The purpose of the separating membrane is to separate the ambient fluid medium to be measured, such as the air or exhaust gases or the like, and the pressure transmission medium from each other. The separating membrane is made of a media-resistant material having a coating that is suitable for further use. Besides the media resistance, it is important that the separating membrane feature adequate flexibility, i.e., that it be as soft as possible. This is to be realized by a thinnest possible design variant. Potential separating membrane materials include steel, PTFE, PI or the like.

The pressure transmission medium is typically an oil having a low rate of thermal expansion, a low viscosity, and a low water absorption rate in order to be insensitive to temperature influences.

The pressure sensor element and the drive and evaluation circuit are to be appropriately selected in accordance with the pressure demands and may be integrated with standard technologies or special technologies, such as embedding, for example. In this case, a flip-chip technology and/or a contacting using through-silicon vias are/is possible, inter alia, where the chips are connected by "bumps" (points of contact).

The openings in the circuit board for the pressure transmission medium are to be imperviously sealed to ensure that no oil is able to leak out. A leakage would change the signals. In some instances, other components, such as capacitors or the like are also included in the circuit substrate. Connections for electrical contacting are present on the circuit substrate.

Within the scope of the present invention, a pressure sensor element is understood to be a sensor element that supplies the actual measurement signals as a function of the pressure and/or of the measurement values that are utilized for recording the pressure of the fluid medium. For example, the pressure sensor element may include a sensor membrane configured as a measuring bridge that has one or a plurality of piezoresistive elements and/or other types of sensitive elements, as is customary for pressure sensors. With regard to other possible embodiments of pressure sensor elements of this type, reference may be made to the related art described above, in particular to Konrad Reif (publisher): *Sensoren im Kraftfahrzeug* [Sensors in the Motor Vehicle], 1st edition, 2010, pp. 80-82 and 134-136. In principle, however, other embodiments are also possible.

Within the scope of the present invention, an evaluation and drive circuit is understood to be a component that is suited for signal processing. For example, the evaluation or drive circuit may be an application-specific integrated circuit-ASIC. A circuit of this kind is an electronic circuit that is realized as an integrated circuit.

Within the scope of the present invention, a circuit substrate is understood to be any component that is suited for supporting a circuit. The circuit substrate is configured as a circuit board, for example. Within the scope of the present invention, a circuit board is understood to be a support for electronic components that is used for mechanically fastening the electrical connection. The circuit boards are made of electrically insulating material having conductive connections, generally referred to as printed conductors, that adhere thereto.

The pressure sensor according to the present invention may be used for diagnosing particulate filters or for recording a counterpressure, such as an exhaust gas back pressure, for example, upstream of a turbocharger.

BRIEF DESCRIPTION OF THE DRAWINGS

Other optional details pertaining to the present invention and features thereof are derived from the following description of preferred exemplary embodiments that are schematically illustrated in the figures.

DETAILED DESCRIPTION OF EXAMPLE EMBODIMENTS

Figure 1:
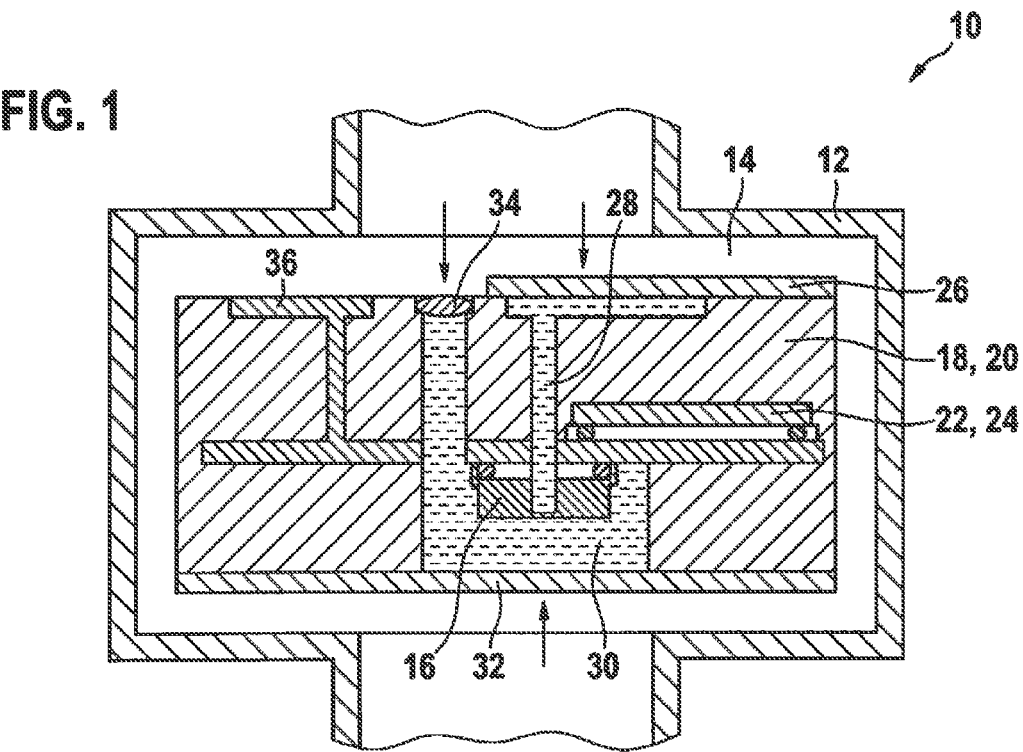
FIG. 1 shows a cross sectional view of a pressure sensor in accordance with a first specific embodiment.

FIG. 1 is a cross-sectional view of a sensor 10 for recording a pressure of a fluid medium in accordance with a first specific embodiment. Pressure sensor 10 may be designed, for example, for recording a pressure in a fuel supply line of a combustion engine or exhaust gases in an exhaust stream of the combustion engine. Pressure sensor 10 shown in FIG. 1 is particularly suited for diagnosing particulate filters. Pressure sensor 10 includes a sensor housing 12. Sensor housing 12 defines a housing interior space 14. Pressure sensor 10 has a first pressure sensor element 16 for recording the pressure of the fluid medium.

A circuit substrate 18 is configured in sensor housing 12 and, more specifically, in housing interior space 14. Circuit substrate 18 is configured as a circuit board 20. A drive and/or evaluation circuit 22 is configured on or in circuit board 20. Drive and/or evaluation circuit 22 is an ASIC 24, for example. First pressure sensor element 16 is configured on or in circuit board 20. First pressure sensor element 16 is separated from the fluid medium by at least one first separating membrane 26. In particular, first pressure sensor element 16 is spaced apart from first separating membrane 26.

A transmission cell 28 is configured between first pressure sensor element 16 and first separating membrane 26. Transmission cell 28 is filled with a transmission medium. The transmission medium is suited for transmitting a pressure of the fluid medium acting on first separating membrane 26 to first pressure sensor element 16. The transmission medium is a liquid, such as oil, for example. Fundamentally suited as a transmission medium are liquids having a low rate of thermal expansion, a low viscosity, and a low water absorption rate in order to be insensitive to temperature influences.

Accordingly, first pressure sensor element 16 and drive and/or evaluation circuit 22 are to be properly selected in accordance with the pressure demands and may be integrated with standard technologies or special technologies, such as embedding, for example. In this case, a flip-chip technology and/or contacting using through-silicon vias are/is possible, inter alia, where the chips of the drive and/or evaluation circuit 22 are connected by "bumps" (points of contact).

First separating membrane 26 is made of a media-resistant material having a suitable coating. Besides the media resistance, the material is selected in consideration of first separating membrane 26 featuring adequate flexibility, i.e., being as soft as possible. This is to be realized by a thinnest possible design variant. Potential materials for first separating membrane 26 include steel, PTFE, PI or the like.

First pressure sensor element 16 is configured, in particular in a sensor element cell 30 in circuit board 20. Sensor element cell 30 is likewise filled with the transmission medium. Sensor element cell 30 is separated from housing interior space 14 of sensor housing 12 by a second separating membrane 32. Second separating membrane 32 may be fabricated identically to first separating membrane 26. Sensor element cell 30 is thereby sealed by a sealing element 34. Printed conductors 36 are configured on circuit board 20 to electrically connect drive and/or evaluation circuit 22 to a connector part (not specifically shown) of sensor housing 12. In the case of illustrated pressure sensor 10, it is possible to record a pressure of the fluid medium that acts on first separating membrane 26. At the same time, a counterpressure may be applied to second separating membrane 32. The counterpressure may be applied mechanically, for example. This makes it possible to record a differential pressure.

Figure 2:
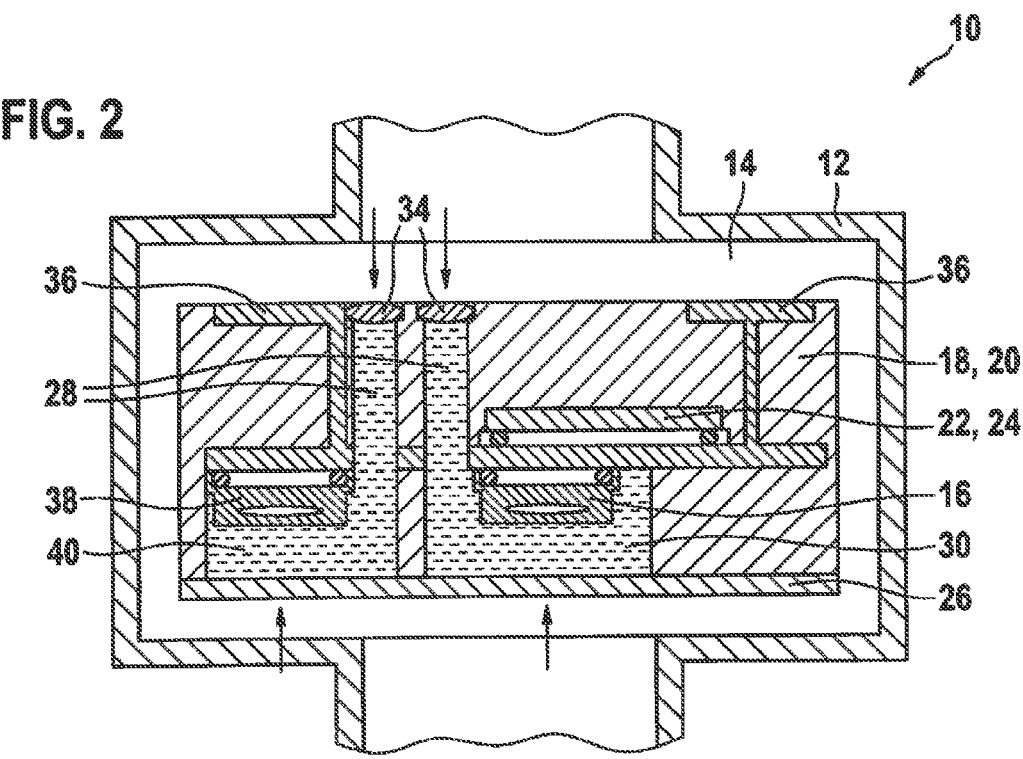
FIG. 2 a cross sectional view of a pressure sensor in accordance with a second specific embodiment.

FIG. 2 shows a pressure sensor 10 in accordance with a second specific embodiment of the present invention. The following merely describes the differences from the first specific embodiment, and the same components are denoted by the same reference numerals.

In comparison to the first specific embodiments, no transmission cell 28 is provided in the case of pressure sensor 10 of the second specific embodiment. In the case of pressure sensor 10 illustrated in FIG. 2, only first separating membrane 26 is provided. Moreover, at least one second pressure sensor element 38, which is designed for measuring a counterpressure applied to first separating membrane 26, may be configured on or in circuit substrate 20. Not only sensor element cell 30, which may be denoted as first sensor element cell 30, but also a second sensor element cell 40 is configured in circuit board 20. Second pressure sensor element 38 is configured in second sensor element cell 40. Second sensor element cell 40 is likewise filled with oil and sealed by a sealing element 34. Second pressure sensor element 38 may be fabricated identically to first pressure sensor element 26.

Thus, pressure sensor 10 shown in FIG. 2 is suited for recording a pressure of the fluid medium acting on first separating membrane 26 and of a counterpressure applied thereto. The counterpressure may be applied electrically, for example. This likewise makes it possible to record a differential pressure.

Figure 3:
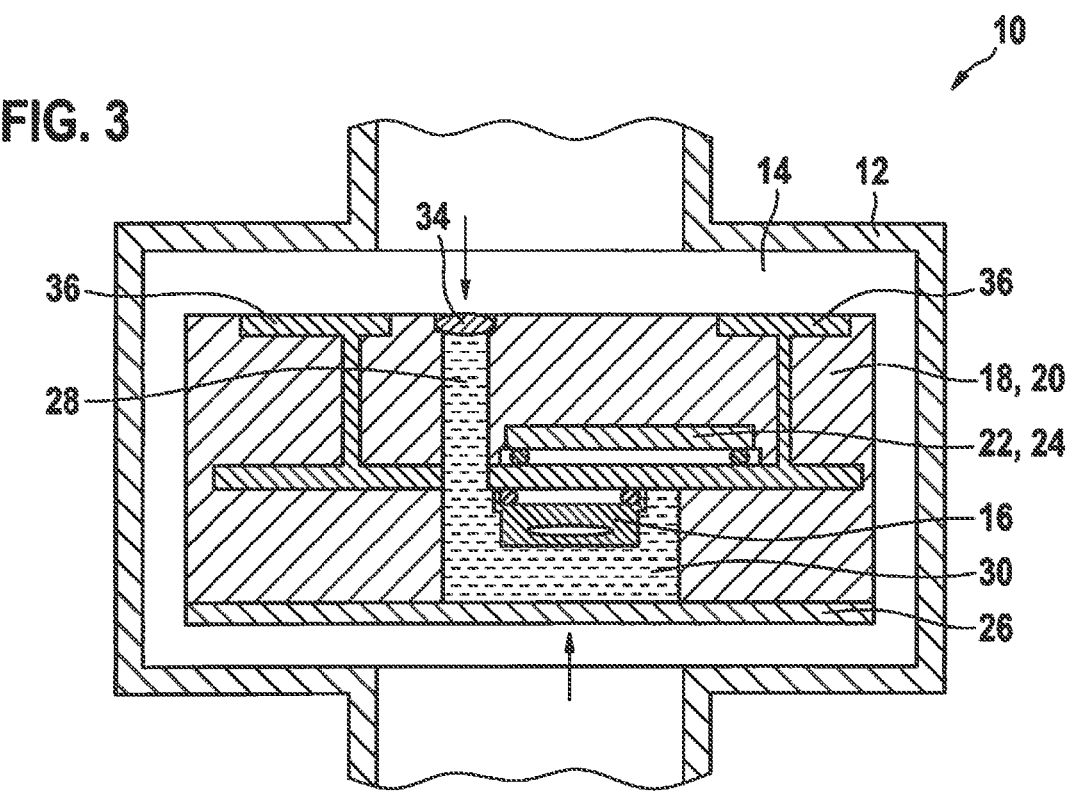
FIG. 3 shows a cross sectional view of a pressure sensor in accordance with a third specific embodiment.

FIG. 3 shows a cross sectional view of a pressure sensor 10 in accordance with a third specific embodiment of the present invention. The following merely describes the differences from the preceding specific embodiments, and the same components are denoted by the same reference numerals.

First pressure sensor element 16 is configured in sensor element cell 30 and is separated from the fluid medium by first separating membrane 26. Sensor element cell 30 is filled with a transmission medium, such as oil, for example, and sealed by a sealing element 34. In the case of illustrated pressure sensor 10, it is possible to record a pressure of the fluid medium that acts on first separating membrane 26. Pressure sensor 10 of third specific embodiment is suited for recording an absolute pressure, as is required, for example, when recording an exhaust gas back pressure upstream, respectively downstream of a turbocharger.

What is claimed is:

1. A pressure sensor for recording a pressure of a fluid medium, comprising:
   a sensor housing;
   at least one first pressure sensor element for measuring a pressure of the medium; and
   at least one of a drive and evaluation circuit, the at least one of the drive and evaluation circuit for outputting a signal indicative of a pressure acting on the first pressure sensor element, the at least one of the drive and evaluation circuit being configured on or in a circuit substrate disposed within the sensor housing;
   wherein the first pressure sensor element is configured on or in the circuit substrate and is separated from the fluid medium by at least one first separating membrane,
   wherein the first pressure sensor element is configured in a sensor element cell in the circuit substrate,
   wherein the sensor element cell is filled with a transmission medium,
   wherein the sensor element cell is sealed by a sealing element.

2. The pressure sensor as recited in claim 1, wherein the first pressure sensor element is spaced apart from first separating membrane.

3. The pressure sensor as recited in claim 1, further comprising:
   a transmission cell configured between the first pressure sensor element and the first separating membrane, the transmission cell being filled with a transmission medium that is suited for transmitting a pressure of the fluid medium acting on the first separating membrane to the first pressure sensor element.

4. The pressure sensor as recited in claim 3, wherein the transmission medium is a liquid, the liquid being oil.

5. The pressure sensor as recited in claim 1, wherein the sensor element cell is separated from an interior space of the sensor housing by a second separating membrane.

6. The pressure sensor as recited in claim 5, wherein the second separating membrane is configured for applying a counterpressure, and the transmission medium in the sensor element cell is suited for transmitting a counterpressure acting on the second separating membrane to the first sensor element.

7. The pressure sensor as recited in claim 1, wherein at least one second pressure sensor element is on or in the circuit substrate, and is designed for measuring a counterpressure applied to the first separating membrane.

\* \* \* \* \*